(12) United States Patent
Davis

(10) Patent No.: US 7,731,463 B2
(45) Date of Patent: Jun. 8, 2010

(54) LOCKING DEVICE

(75) Inventor: Mathew Davis, Barnstable (GB)

(73) Assignee: Parker Hannifin plc, Barnstaple, Devon (GB)

( * ) Notice: Subject to any disclaimer, the term of this patent is extended or adjusted under 35 U.S.C. 154(b) by 629 days.

(21) Appl. No.: 11/534,235

(22) Filed: Sep. 22, 2006

(65) Prior Publication Data
US 2007/0041784 A1 Feb. 22, 2007

(30) Foreign Application Priority Data
Mar. 26, 2004 (GB) ................................. 0406879.7
Mar. 18, 2005 (GB) ............... PCT/GB2005/001020

(51) Int. Cl.
*F16B 39/10* (2006.01)

(52) U.S. Cl. ...................................................... 411/119

(58) Field of Classification Search ................ 411/119, 411/120, 160, 161
See application file for complete search history.

(56) References Cited

U.S. PATENT DOCUMENTS

| | | | | |
|---|---|---|---|---|
| 531,024 A * | 12/1894 | Dolan | ......................... | 411/120 |
| 653,043 A * | 7/1900 | Stand | ......................... | 411/120 |
| 874,773 A * | 12/1907 | Lake | ......................... | 411/119 |
| 916,997 A * | 4/1909 | Chadwick | ................... | 411/120 |
| 1,088,515 A * | 2/1914 | Bazin | ......................... | 411/120 |
| 1,190,318 A * | 7/1916 | Nelson | ......................... | 411/120 |
| 2,190,075 A * | 2/1940 | Love | ........................... | 411/120 |
| 3,493,026 A | 2/1970 | Donofrio | | |
| 4,734,001 A * | 3/1988 | Bennett | ....................... | 411/119 |
| 4,735,533 A | 4/1988 | Gallagher et al. | | |
| 4,940,374 A * | 7/1990 | Gallagher | .................... | 411/120 |
| 5,094,117 A | 3/1992 | Mikel et al. | | |
| 5,415,509 A * | 5/1995 | Martin et al. | ................ | 411/123 |
| 5,533,849 A * | 7/1996 | Burdick | ....................... | 411/120 |
| 6,439,616 B1 | 8/2002 | Karafillis et al. | | |
| 6,948,782 B2 * | 9/2005 | Porter et al. | ............. | 301/105.1 |

FOREIGN PATENT DOCUMENTS

| EP | 0001902 | 5/1979 |
|---|---|---|
| GB | 1065822 | 4/1967 |

OTHER PUBLICATIONS

International Search Report and Writte Opinion in corresponding PCT Application No. PCT/GB2005/001020.

\* cited by examiner

*Primary Examiner*—Flemming Saether
(74) *Attorney, Agent, or Firm*—John A. Molnar, Jr.

(57) ABSTRACT

A locking device is disclosed for preventing rotation of one component relative to another component to which it is connected. The locking device comprises a locking plate having a component engaging portion to engage one component, A surface of the locking plate is grooved to engage with a grooved surface carried by the other component. One or more fixing holes are provided for one or more fixing members to be passed through, to force the grooved surface of the locking plate into engagement with the grooved surface carried by the other component.

20 Claims, 5 Drawing Sheets

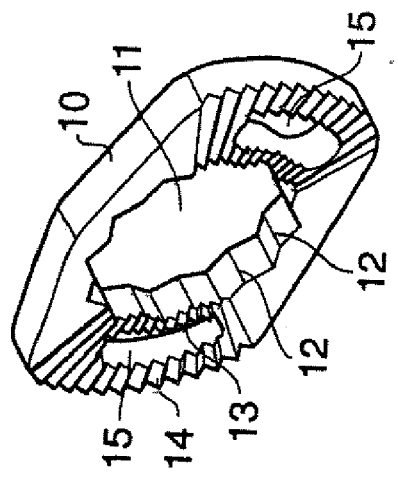
Fig. 1c
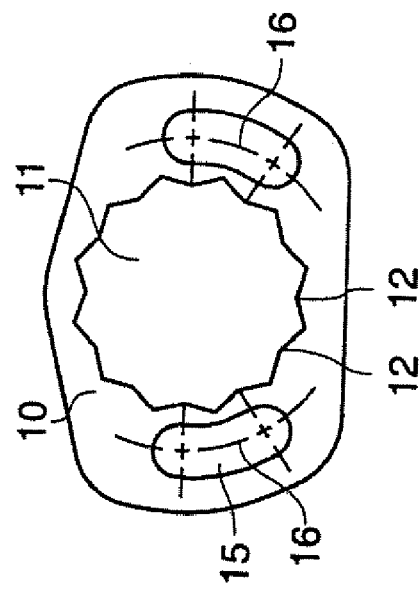
Fig. 1a
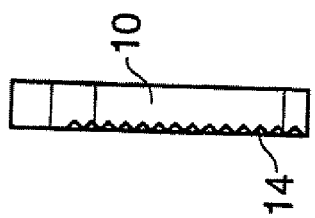
Fig. 1e
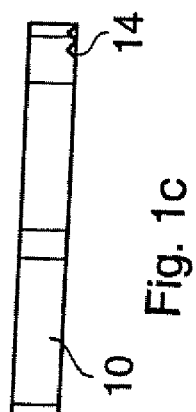
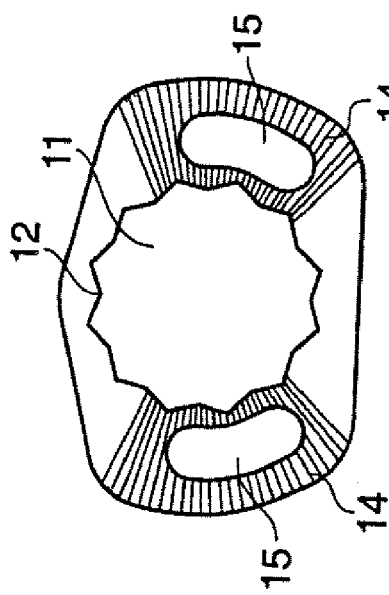
Fig. 1b
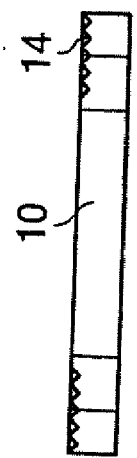
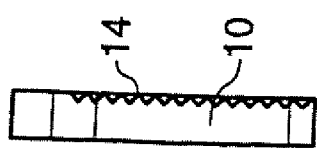
Fig. 1f

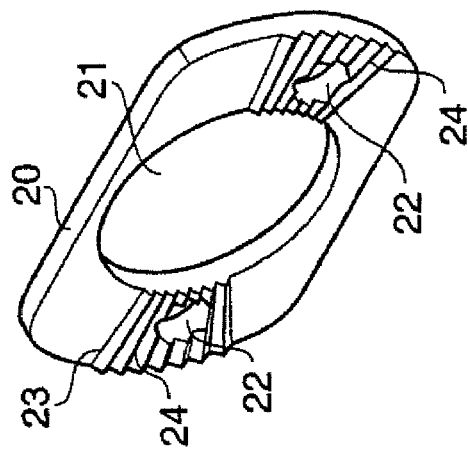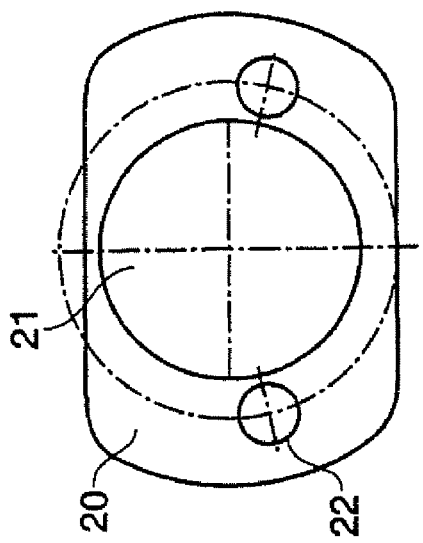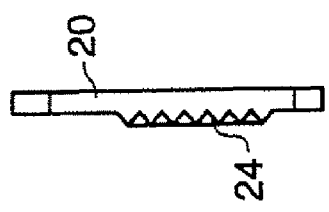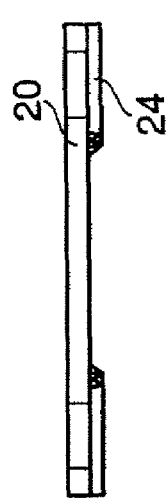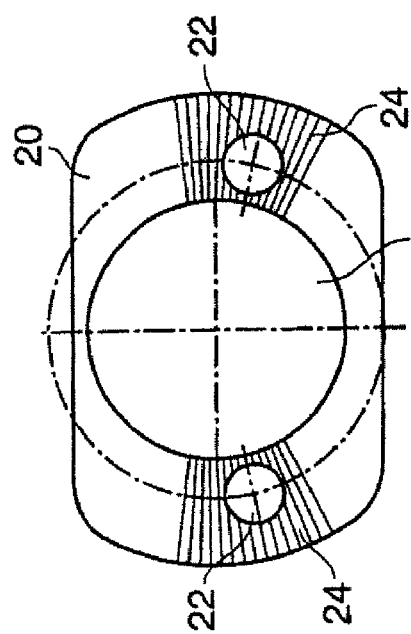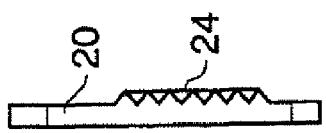

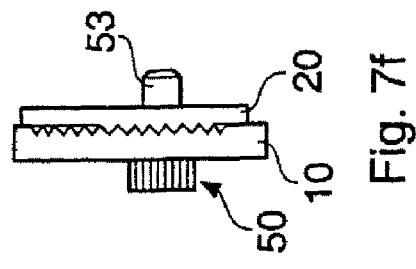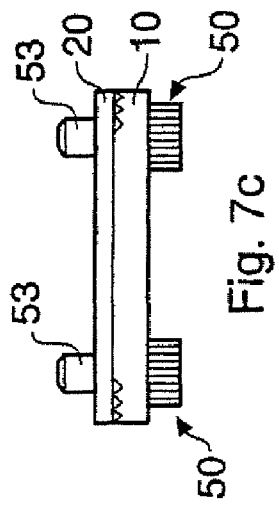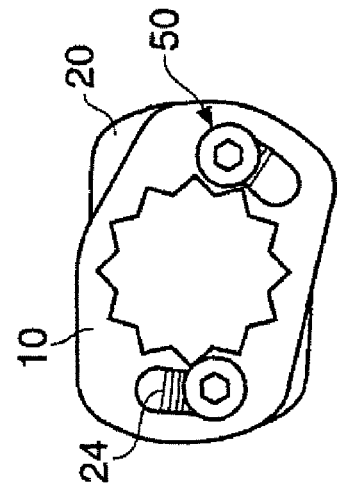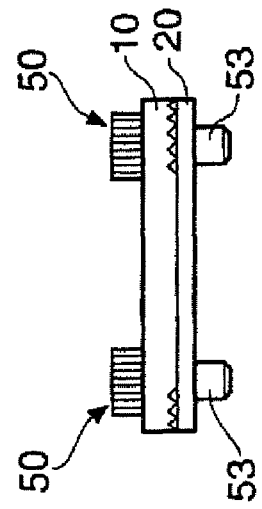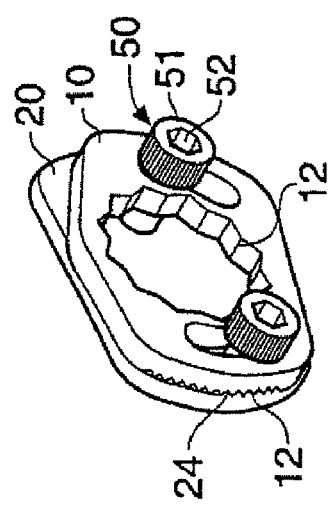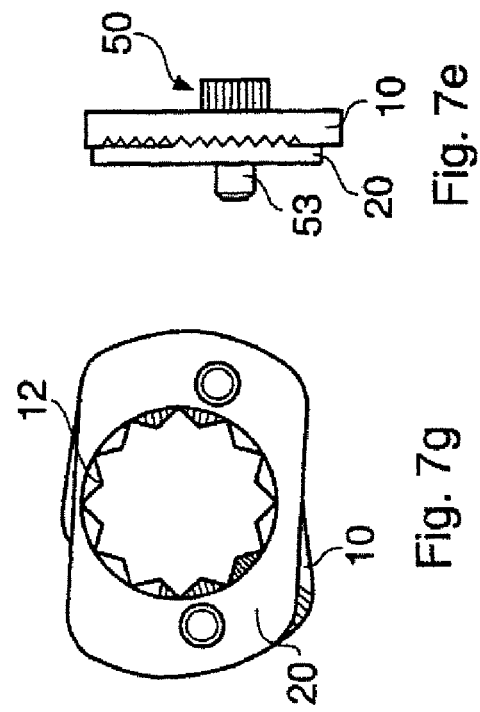

LOCKING DEVICE

CROSS REFERENCE TO RELATED APPLICATIONS

This application is a continuation of co-pending International Application No. PCT/GB05/001020 filed on Mar. 18, 2005, which designated the United States and is incorporated herein by reference, and which claims priority to Great Britain Patent Application Serial No. 0406879.7 filed on Mar. 26, 2004.

BACKGROUND OF THE INVENTION

The present invention relates to locking devices, in particular to a locking device for preventing rotation of one component relative to another component to which it is connected.

Inappropriate unfastening or rotation of one component, such as a bayonet connection or threaded fastener, relative to another component can be very problematic. Many different ways of preventing inappropriate unfastening have been devised, which generally involve use of a locking pin or cam surface to prevent rotation of one component relative to the other. For example, it is common to use one 15 or more locking pins that are inserted into sockets in a body in which a bayonet connection or a threaded fastener is located. The locking pins are located adjacent to and arranged to abut against the bayonet connection or threaded fastener to prevent its rotation in one or both directions. A problem with such a method, is that the locking pins are only able to withstand a limited torque, typically 150 lb.f.ft (200 Nm) before failure. When a more secure locking of the bayonet connection or threaded fastener is required, it may be welded in place. However, this prevents its future removal. Furthermore, use of locking pins generally requires the bayonet connection or threaded fastener to be oriented in a particular manner in order to allow the locking pin to be located in the pre-formed socket making it awkward to lock in place.

SUMMARY OF THE INVENTION

According to an illustrated embodiment of the present invention there is provided a locking device for preventing rotation of one component relative to another component to which it is connected, the locking device comprising a locking plate having a component engaging portion to engage one component to substantially prevent rotation of the locking plate relative to the component, a surface of the locking plate being grooved to engage with a grooved surface carried by the other component and one or more fixing holes for one or more fixing members to be passed through, to force the grooved surface of the locking plate into engagement with a grooved surface carried by the other component.

Inter-engagement of the grooved surface of the locking plate with the grooved surface carried by the other component provides a far greater ability to withstand torques than conventional locking fasteners. Examples of locking fasteners illustrating the present invention have been found to withstand torques of greater than 500 lb.f.ft (680 Nm).

The rotation of any two suitable interconnected components may be prevented by the locking device. For example, the locking device may prevent the rotation of a threaded component such as a bolt head or a nut relative to a body in which or to which it is threaded, a bayonet connection relative to a body in which it is provided or two interconnected components such as nuts, attached to each other by a screw thread or some other mechanism.

The grooved surface carried by the other component may be a grooved surface on the other component or a grooved surface fixed to the other component. The grooved surface fixed to the other component may be provided on a medial plate to be attached, in use, to the other component between the other component and the locking plate or a further locking plate engaged with the other component. The medial plate preferably has a receiving hole to be fitted over the first component. The receiving hole in the medial plate should be at least as large as the largest extent of the receiving hole in the locking plate and may be larger than the largest extent of the receiving hole in the locking plate. The receiving hole in the medial plate may have any suitable shape. In a preferred embodiment, the receiving hole in the medial plate is of circular cross-section. The medial plate may be provided with one or more fixing holes to be aligned, in use, with the one or more fixing holes of the locking plate so that the locking plate and medial plate may be fixed to the other component with the same one or more fixing members.

The locking plate component engaging portion may be a receiving hole with an appropriate number of internal corners to engage with the component, over which it is fitted. The internal form of the receiving hole will be dependent upon the external form of the component over which it is to be fitted. The component over which it is fitted may be a bolt head or a nut for example with a polygonal periphery such as a hexagon or an octagon or a cylindrical form with a number of flats machined into it. The number of internal corners on the locking plate receiving hole is dependent upon the number of axes of symmetry of the component over which it is fitted. The locking plate receiving hole may have twice as many internal corners as the number of sides of the periphery of the component such as the head of a threaded member to which it is to be fitted. Alternatively, it could have the same number of internal corners as the number of sides of the periphery of the component to which it is to be fitted, or three times, four times or any suitable multiple. The internal shape of the receiving hole in the locking plate may be defined by two corresponding polygons of the cross-section of the component, such as the head of a threaded fastener to which it is to be fitted, with each polygon superimposed upon one another, with one polygon being offset relative to the other by an angle of half the interior angle of two adjacent sides of the polygon. For example, for a bolt head with a hexagonal periphery, the locking plate receiving hole is preferably the shape of two corresponding superimposed 30° rotationally offset hexagons with 12 internal corners. For a bolt head with an octagonal periphery the locking plate receiving hole is preferably the shape of two corresponding superimposed 22.5° rotationally offset octagons with 16 internal corners. By providing the locking plate receiving hole with twice as many internal corners as there are sides of the component over which it is fitted, the locking plate will only have to be rotated by a relatively small angle to be able to be fitted over the component with the internal corners engaging the component regardless of the rotational position of the component. For example for a bolt head with a hexagonal periphery, if the locking plate receiving hole has 12 internal corners, the locking plate receiving hole will be able to be fitted over the bolt head with the internal corners engaging the hexagonal periphery of the bolt head with the locking plate only needing to be rotated a maximum of 360°/12=30° whatever the rotational position of the bolt head. For a bolt head with an octagonal periphery, if the locking plate receiving hole has 16 internal corners, the locking plate receiving hole will be able to be fitted over the bolt head with the internal corners engaging the octagonal periphery of the bolt head with the locking plate only needing to be rotated by a maximum of 360°/16=22.5° whatever the rotational position of the bolt head.

The locking plate component engaging portion need not be a receiving hole. The first component engaged by the component engaging portion may not have an external form which can be engaged, such as a socket cap set screw with an internal recess in an appropriate shape such as a hexagon for example. In this case the component engaging portion on the locking plate would be a protrusion with external corners. The number and position of the external corners would be dependent upon the socket to be engaged, but it may have the same number of external corners as there are internal corners of the socket to correspond to the socket or it may have twice as many, three times as many or any suitable multiple of the number of internal corners in the socket.

The grooves on the locking plate are preferably arranged to extend along circumferentially spaced substantially radial lines extending from the center of curvature of a circle upon which the polygonal edge of the component engaging portion lies and the grooves on the other component or the medial plate are arranged to extend along circumferentially spaced substantially radial lines extending from substantially the center of curvature of the other component or the center of curvature of the receiving hole of the medial plate. As the grooves on the locking plate and the 5 other component or medial plate extend substantially radially, the locking plate can be rotated relative to the other component or the medial plate and the grooves will still be aligned and thus able to be engaged with each other to produce good resistance to torque whatever their relative rotational positions.

The grooves preferably comprise a V-shaped cross-sectional profile in order to provide improved grip. The grooves may be provided by ridges extending from the surface of the locking plate and the body or medial plate. Alternatively, the grooves may be provided by ridges extending from one surface and indentations provided in the other corresponding surface.

As the locking plate only needs to be rotated by a relatively small angle to be able to be fitted over the component, with the component engaging portion engaging the component, the grooves need not extend over the whole surface of the locking plate. The grooves can extend over only a portion of the locking plate surface to be able to engage with corresponding grooves on corresponding portions of the other component or the medial plate. The grooves could for example extend in arcs of 90° or less on each side of the locking plate. The grooves on the other component or medial plate could also extend in arcs of 90° or less, or smaller arcs such as 70° or 50°. As the grooves do not have to extend over the whole surface of the locking plate, machining and production costs are reduced. The grooved surface portions of the plates preferably extend at least in the region of the fixing holes and/or slots.

The one or more locking plate fixing holes are preferably in the form of curved slots with the curve being centered on the center of curvature of a circle upon which the polygonal edge of the component engaging portion lies. The use of curved slots enables fixing members to be passed through the curved slots to engage fixed points on the other component, such as preformed sockets on a body, whatever the relative orientation of the component and the locking plate. The angle of the curve preferably extends at least the maximum angle through which the locking plate must be rotated for the component engaging portion to be able to engage the component over which it is fitted (for example, as explained earlier 30° for a receiving hole with 12 internal corers to be fitted over a head of a threaded fastener in the form of a bolt head with a hexagonal periphery) plus an allowance for the thickness of a fixing member to be passed through the slot. Typical angles of curved fixing slots for locking plates to be used with different shaped first components may be, for example, substantially 50° or less, substantially 35° or less, substantially 25° or less. There are preferably two curved fixing slots on opposite sides of the component engaging portion.

The locking plate fixing holes or curved slots are arranged for one or more fixing members to be passed therethrough. The fixing members may take any convenient form such as rivets, headed knurled pins or threaded retainers such as screws or bolts to be passed into and secured to the other component through the fixing holes or curved fixing slots of the locking plate. The other component may have preformed sockets which may or may not be threaded to receive the fixing members. The fixing members preferably have heads to engage the outside surface of the locking plate to force the grooves of the locking plate into engagement with the grooves carried by the other component. If a medial plate is used between the other component and the locking plate, it may have one or more fixing holes through which fixing members may be passed. The one or more fixing holes of the medial plate are preferably arranged such that the one or more fixing members pass through the fixing holes or curved slots of the locking plate and the fixing holes of the medial plate. The one or more fixing members may also engage preformed holes in the body.

An illustrated method according to the present invention involves preventing rotation of one component relative to another component to which it is connected. Such method includes fitting a component engaging portion of a locking plate over one component such that it engages the component to substantially prevent rotation of the locking plate relative to the component and such that a grooved surface of the locking plate engages with a grooved surface carried by another component One or more fixing members then are passed through one or more corresponding receiving holes in the locking plate to force the grooved surface of the locking plate into engagement with the grooved surface carried by the other component.

The present invention, accordingly, comprises the construction, combination of elements, and/or arrangement of parts and steps which are exemplified in the detailed disclosure to follow.

The aforementioned advantages and other advantages of the present invention will be readily apparent to those skilled in the art based upon the disclosure contained herein.

BRIEF DESCRIPTION OF THE DRAWINGS

For a fuller understanding of the nature and objects of the invention, reference should be had to the following detailed description taken in connection with the accompanying drawings wherein:

FIGS. 1a, 1b, 1c, 1d, 1e, 1f and 1g show various views of a locking plate;

FIGS. 2a, 2b, 2c, 2d, 2e, 2f and 2g show various views of a medial plate;

FIGS. 7a, 7b, 7c, 7d, 7e, 7f, and 7g show various views of the assembled plates and fixing members.

Figure 3:
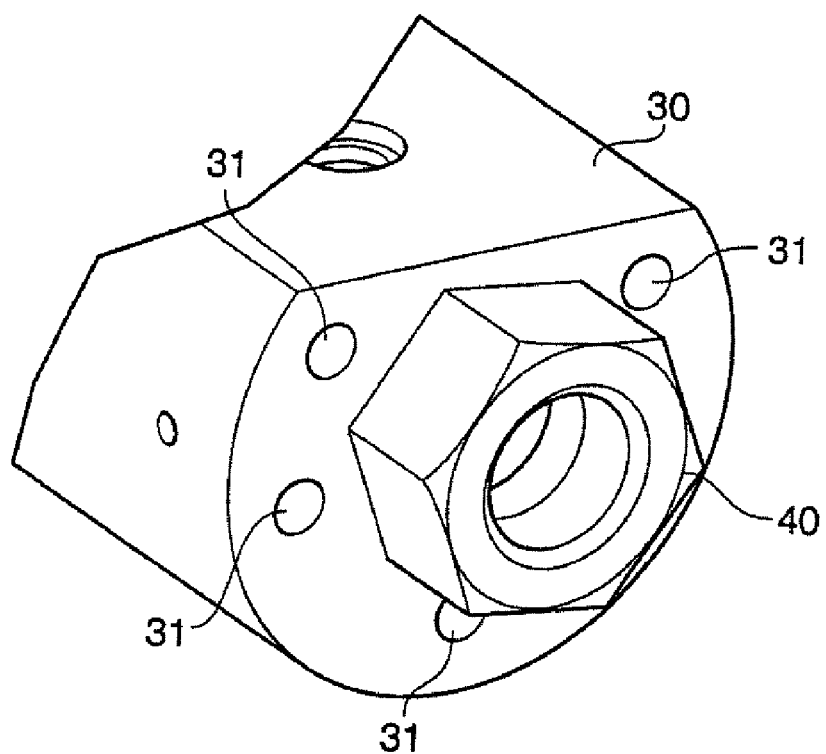
FIG. 3 shows a perspective view of a threaded fastener and a body in which it is threaded prior to fitting of the locking fastener.

The drawings will be described further in connection with the following Detailed Description of the Invention.

DETAILED DESCRIPTION OF THE INVENTION

FIG. 1a shows a perspective view of a locking plate 10. The locking plate 10 has a component engaging portion, in this example a receiving hole 11 to be fitted, in use over a head of a first component (not shown in this FIG.). The receiving hole 11 has a plurality of equiangularly spaced internal corners 12 to engage with the head of the first component. A surface 13 of the locking plate 10 has grooves 14 to engage with a grooved surface carried by another component or to which the first component is connected. Two fixing holes, in this example curved fixing slots 15, are provided for fixing members to be passed through to force the grooves 14 of the locking plate 10 into engagement with a grooved surface carried by another component.

FIG. 1b shows a top view of the locking plate 10. In this example the shape of the receiving hole 11 is defined by two corresponding regular hexagons superimposed upon one another, with one hexagon being rotated relative to the other by 30°. The peripheral edge of the receiving hole of this example provides 12 internal corners to engage with the corners of a first component which may be a hexagonal head of a threaded fastener or a hexagonal nut for example. When used with components with different shapes, such as square, pentagonal, octagonal etc the shape of the receiving hole 11 will be selected to conform to the shape of the component to be used.

As can be seen in FIG. 1b, the grooves 14 of the locking plate 10 extend along circumferentially spaced substantially radial lines extending from substantially the center of curvature of a circle upon which the polygonal edge of the receiving hole 11 lies. As shown in the side views, FIGS. 1c, 1d, 1e and 1f, the grooves 14 have a generally V-shaped cross-sectional profile. In this example the grooves 14 are recessed into the locking plate 10.

As shown in FIGS. 1a, 1b and the rear view of the locking plate 10 in FIG. 1g, curved fixing slots 15 are provided on opposite sides of the receiving hole II The center of curvature of each curved fixing slot 15 is the same as the center of curvature of a circle upon which the polygonal edge of the receiving hole 11 lies. Each curved fixing slot 15 runs along the same circular line 16 as shown in FIG. 1g.

FIG. 2a shows a perspective view of a medial plate 20 which may be provided between a second component, such as a body to which the first component is connected and the locking plate 10. The medial plate 20 has a receiving hole 21 to be fitted, in use, over a head of the first component, which may be a threaded fastener for example. The medial plate 20 need not engage with the threaded fastener and so may have a receiving hole 21 of any shape. In this example it is circular. The medial plate 20 is provided with fixing holes 22 to enable it to be fixed to another component such as a body by passing fixing members such as screws or bolts through the fixing holes 22 and into engagement with the body. A surface 23 of the medial plate 20 is provided with grooves 24 to be engaged with corresponding grooves 14 on a surface 13 of the locking plate 10. Like the grooves 14 of the locking plate 10, the grooves 24 of the medial plate 20 extend along circumferentially spaced substantially radial lines extending from substantially the center of curvature of the receiving hole 21.

As shown in the top view of the medial plate 20 in FIG. 2b, the fixing holes 22 are provided in the grooved surface 23. They are positioned in this example to be aligned in use with the curved fixing slots 15 of the locking plate 10.

As shown in the side views, FIGS. 2c, 2d, 2e and 2f, the grooves 24 of the medial plate 20 have a generally V-shaped cross-sectional profile to engage with the grooves 14 of the locking plate. In this example the grooves 24 project out of the medial plate 20 to engage with the recessed grooves 14 of the locking plate t O.

FIG. 2g shows a rear view of the medial plate 20 which is to be engaged with a body.

If a second component has suitable grooves to inter-engage with the grooves 14 on the locking plate 10, then the medial plate 20 will not be required.

FIGS. 3 to 6 show a method of installing the medial plate 20 and locking plate 10 on to a body with a threaded fastener therein.

As shown in FIG. 3, the body 30 has a threaded fastener, in this example a bolt with a bolt head 40 having a hexagonal periphery, threaded therein. In the example the body 30 does not have grooves preformed thereon. However, it does have a number of preformed threaded sockets 31 into which threaded fixing members may be secured.

Figure 4:
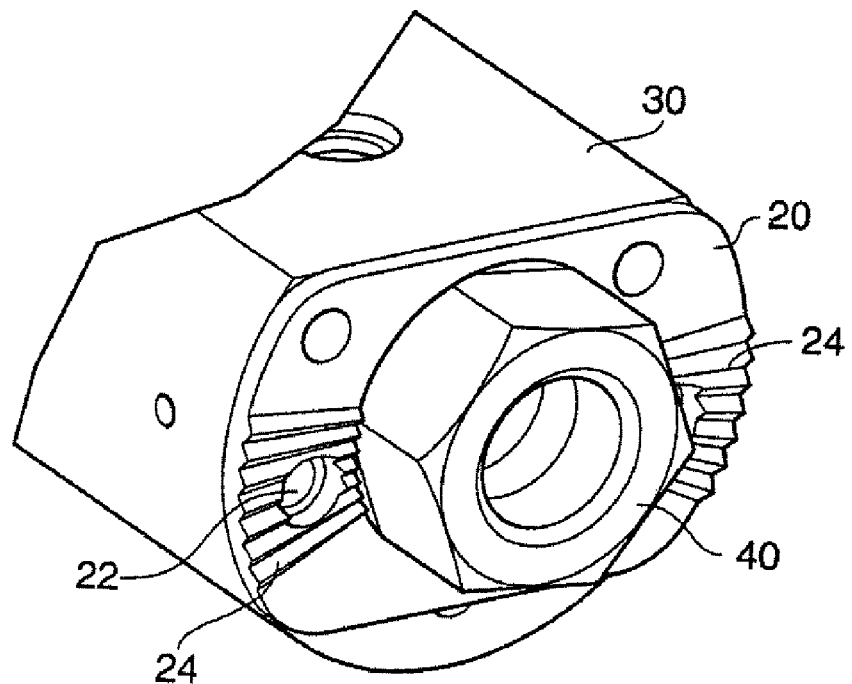
FIG. 4 shows a perspective view of a medial plate fitted over a head of the threaded fastener.

FIG. 4 shows a medial plate 20 installed over the bolt head 40 such that the rear face of the medial plate contacts the face of the body 30 and the grooves 24 on the medial plate 20 are presented outwardly. The medial plate 20 could be secured to the body 30 by any suitable means, but in this example it is secured to the body 30 using the same fixing members used to secure the fixing plate 10 to the body 30 as described later. The medial plate fixing holes 22 are aligned with corresponding preformed holes 31 in the body 30 ready for subsequent insertion of fixing members.

Figure 5:
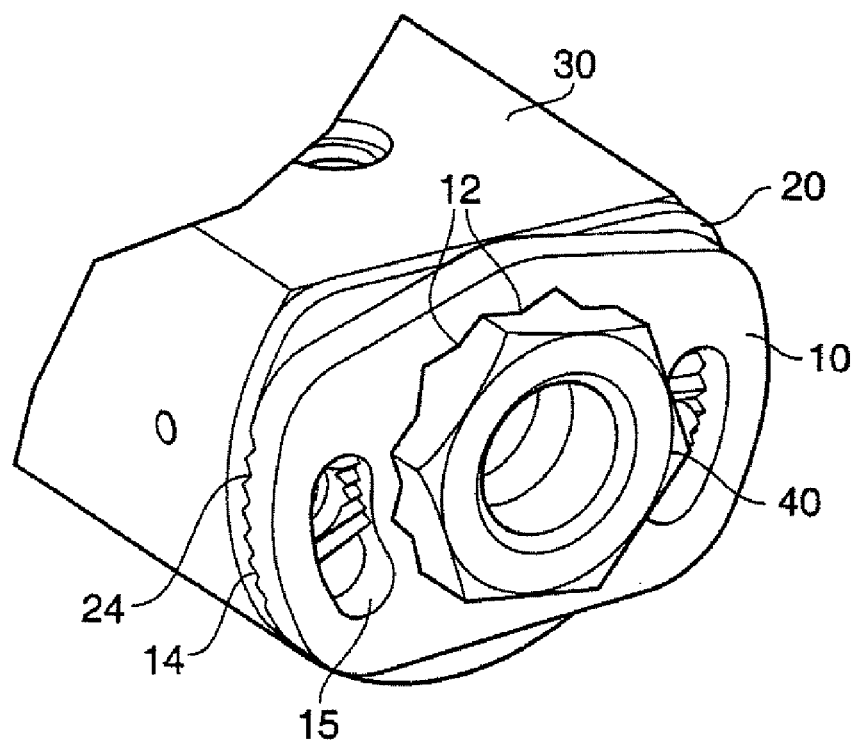
FIG. 5 shows a perspective view of a medial plate and a locking plate fitted over the head of the threaded fastener.

FIG. 5 shows the locking plate 10 installed over the bolt head 40 with the locking plate 10 contacting the medial plate 20 with their respective grooves 14, 24 engaged. In this example the bolt head 40 has a hexagonal periphery and the locking plate 10, as described in detail with reference to FIGS. 1a to 1g, has a receiving hole 11 with an internal periphery defined by two corresponding regular hexagons superimposed upon one another, with one hexagon being rotated relative to the other by 30° to produce 12 internal corners. Installing the receiving hole 11 of the locking plate over the bolt head 40 may involve rotating the locking plate 10 about the center of curvature of a circle upon which the polygonal edge of the receiving hole 11 lies by up to 30° to position the internal corners 12 into engagement with the sides of the bolt head 40. As the locking plate 10 only needs to be rotated by a relatively small angle for the internal corners 12 to engage the edge of the bolt head 40, the curved fixing slots 15 can be aligned with the fixing holes 22 of the medial plate 20 and the preformed holes 21 in the body 30.

Figure 6:
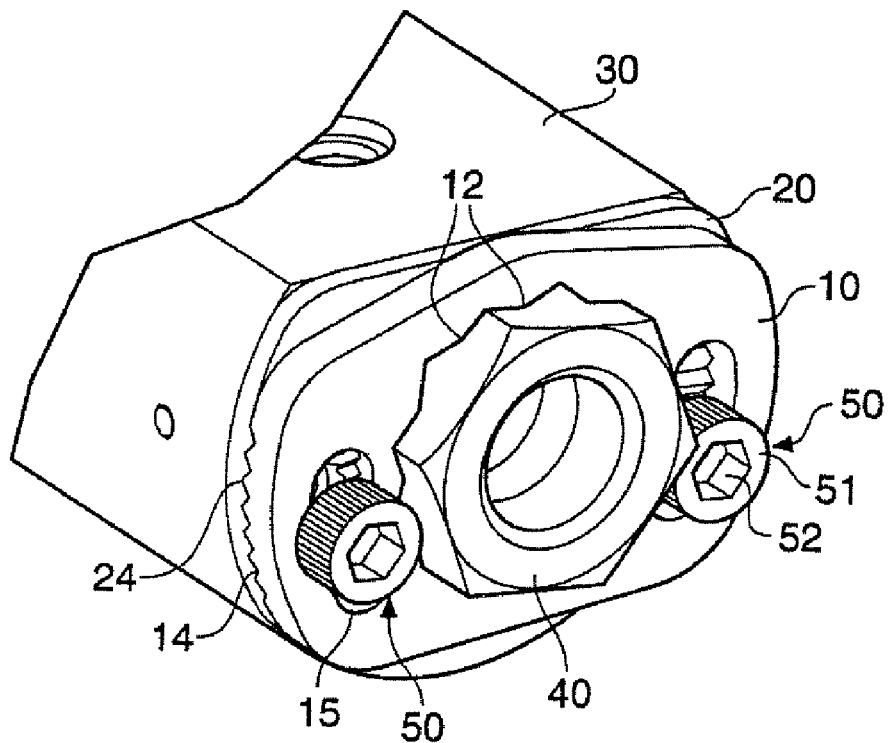
FIG. 6 shows a perspective view of fixing members passing through fixing holes in the locking plate and the medial plate to secure them to the body.

FIG. 6 shows the insertion of retainers 50 through the aligned curved fixing slots 15 of the locking plate 10, the fixing holes 22 of the medial plate 20 and the preformed holes 31 in the body. In this example the retainers 50 are threaded bolts, but they need not be threaded and could be rivets or headed knurled pins for example. Tightening of the threaded retainers 50 forces the grooves 11J 24 of the plates 10, 20 into engagement with each other which provides a very strong resistance to torques applied to the bolt head 40 which could otherwise cause undesired loosening of the bolt head 40. The threaded retainers in this example have a head 51 with a circular periphery and a hexagonal recess or socket 52 therein. As the head 51 has a circular periphery it is resistant to torque forces. The threaded retainers 50 are tightened by positioning a special key (not shown) into the hexagonal recess or socket 52 and rotating the key.

FIG. 7a shows a perspective view of the locking plate 10, the medial plate 20 and the retainers 50 with the body and bolt head omitted for clarity. The relative rotational positions of the locking plate 10 and medial plate 20 will have been defined by the rotational position of the bolt head. The locking plate will have been rotated by up to 30° (for this example with a hexagonal bolt head and a receiving hole with 12 internal corners) to engage the internal corners with the sides of the bolt head. The curve of slots 15 extends by 30° relative to the center of curvature plus an allowance for the thickness of the threaded retainers to ensure that the curved slots 15 can be aligned with the fixing holes 22 of the medial plate 20, whatever the rotation of the locking plate 10. In practice, for a hexagonal bolt head 40 and a receiving hole with 12 internal corners the curve of slots 15 may extend between approximately 30° and 35°.

FIG. 7b shows a front view of the locking device and FIG. 7c, 7d, 7e and 7f show side views of the locking device with a threaded portion 53 of the threaded retainers which is secured in the body in view. FIG. 7g shows the rear view of the locking device.

It would be possible to use the grooves to measure how much a threaded connector had been tightened. For example if the end user had the locking device assembled over a threaded connector and a leak occurred he/she would need to tighten the threaded connector slightly. In the past any such tightening would be recorded simply as $\frac{1}{16}$ of a turn. However if the locking device of the present invention was used, the end user could lift the locking plate out of the corresponding grooves with which it was engaged and then tighten the threaded connector by 1 groove (i.e. until the next pair of grooves lined up). In this case the tightening would be recorded as 1 groove rather than the cruder $\frac{1}{16}$ of a turn.

The locking plate 10 and medial plate 20 could be made from any suitable material such as a metal or a plastic. However, if used in aggressive environments stainless steel has been found to advantageously provide the required strength and corrosion resistance.

Many variations may be made to the example described above whilst still falling within the scope of the present invention. For example, if the second component had suitable preformed grooves, the medial plate 20 would not be required. Furthermore, the retainers 50 could be screws to be screwed through the curved fixing slots 15 of the locking plate and the fixing holes 22 of the medial plate into the body 30 or need not be threaded at all and could be rivets or headed knurled pins for example. The first component, shown as a bolt head 40, in FIGS. 3 to 6 need not have an external form which can be locked. This would be the case for example with a socket cap. In this case the locking plate would have a component engaging portion in the form of a protrusion with external corners to engage the inside of the socket cap. The locking device need not be used to lock a threaded fastener to a body, but could be used with two components connected to each other without a thread, for example in the situation of a bayonet connection. The locking device could also be used without a body by two components such as two nuts being connected to each other by a screw thread or other component.

It is anticipated that certain changes may be made in the present invention without departing from the precepts herein involved. Accordingly, the foregoing description should be interpreted as illustrative and not in a limiting sense. All references including any priority documents cited herein are expressly incorporated by reference.

What is claimed is:

1. A locking device for preventing rotation of a first component relative to a second component to which the first component is connected, the second component having one or more preformed holes and the locking device comprising:
   a locking plate having a component engaging portion to engage the first component to substantially prevent rotation of the locking plate relative to the first component, a first grooved surface of the locking plate having first grooves and one or more fixing holes each for registration with a corresponding one of the preformed holes in the second component; and
   a medial plate to be attached, in use, to the second component between the second component and the locking plate, the medial plate having a receiving hole to be fitted over the first component and a second grooved surface with second grooves to engage with the first grooved surface of the locking plate, with the second grooves of the medial plate arranged to extend along circumferentially spaced substantially radial lines extending from substantially the center of curvature of the receiving hole, wherein the first grooved surface of the locking plate engages with the second grooved surface of the medial plate,
   whereby one or more fixing members each are passed through a corresponding one of the fixing holes and into the corresponding one of the preformed holes in the second component securing the locking device to the second component and forcing the first grooved surface of the locking plate into engagement with the second grooved surface of the medial plate.

2. The locking device of claim 1, wherein the component engaging portion has corners to engage the first component.

3. The locking device of claim 2, wherein the component engaging portion is a receiving hole to be fitted over the first component, with the receiving hole having one or more internal corners to engage the first component.

4. The locking device of claim 3, wherein the internal shape of the locking plate receiving hole is defined by two corresponding polygons of the cross-section of the first component to which it is to be fitted, with each polygon superimposed upon one another, with one polygon being offset relative to the other by an angle of half the interior angle of two adjacent sides of the polygon.

5. The locking device of claim 4, wherein the internal shape of the locking plate receiving hole is defined by two corresponding regular hexagons, with each regular hexagon superimposed upon one another, with one hexagon being offset relative to the other by 30° to produce 12 equiangularly spaced internal corners.

6. The locking device of claim 1, wherein the first grooves on the first grooved surface of the locking plate extend along circumferentially spaced substantially radial lines extending from substantially the center of curvature of a circle upon which the edge of the component engaging portion lies.

7. The locking device of claim 1, wherein the first grooves on the first grooved surface of the locking plate have a V-shaped cross-sectional profile.

8. The locking device according to of claim 1, wherein the one or more locking plate fixing holes are in the form of curved slots with the curve being centered on the center of curvature of a circle upon which the edge of the component engaging portion lies.

9. The locking device of claim 1, wherein the medial plate receiving hole is circular.

10. The locking device of claim 1, wherein the medial plate has fixing holes to be aligned, in use, with the fixing holes or fixing slots of the locking plate.

11. An assembly comprising:
- a first component;
- a second component connected to the first component, the second component having one or more preformed holes;
- a locking device for preventing rotation of the first component relative to the second component, the locking device comprising a locking plate having a component engaging portion the first component to substantially prevent rotation of the locking plate relative to the first component, a first grooved surface of the locking plate having first grooves and one or more fixing holes each for registration with a corresponding one of the preformed holes in the second component; and
- a medial plate to be attached, in use, to the second component between the second component and the locking plate, the medial plate having a receiving hole to be fitted over the first component and a second grooved surface with second grooves to engage with the first grooved surface of the locking plate, with the second grooves of the medial plate arranged to extend along circumferentially spaced substantially radial lines extending from substantially the center of curvature of the receiving hole, wherein the first grooved surface of the locking plate engages with the second grooved surface of the medial plate; and
- one or more fixing members each to be passed through a corresponding one of the fixing holes and into the corresponding one of the preformed holes in the second component securing the locking device to the second component and forcing the grooved surface of the locking plate into engagement with the grooved surface of the medial plate.

12. The assembly of claim 11, wherein the component engaging portion has corners to engage the first component.

13. The assembly of claim 12, wherein the component engaging portion is a receiving hole to be fitted over the first component, with the receiving hole having one or more internal corners to engage the first component.

14. The assembly of claim 13, wherein the internal shape of the locking plate receiving hole is defined by two corresponding polygons of the cross-section of the first component to which it is to be fitted, with each polygon superimposed upon one another, with one polygon being offset relative to the other by an angle of half the interior angle of two adjacent sides of the polygon.

15. The assembly of claim 14, wherein the internal shape of the locking plate receiving hole is defined by two corresponding regular hexagons, with each regular hexagon superimposed upon one another, with one hexagon being offset relative to the other by 30° to produce 12 equiangularly spaced internal corners.

16. The assembly of claim 11, wherein the first grooves on the first grooved surface of the locking plate extend along circumferentially spaced substantially radial lines extending from substantially the center of curvature of a circle upon which the edge of the component engaging portion lies.

17. The assembly of claim 11, wherein the first grooves on the first grooved surface of the locking plate have a V-shaped cross-sectional profile.

18. The assembly according to of claim 11, wherein the one or more locking plate fixing holes are in the form of curved slots with the curve being centered on the center of curvature of a circle upon which the edge of the component engaging portion lies.

19. The assembly of claim 11, wherein the medial plate receiving hole is circular.

20. The assembly of claim 11, wherein the medial plate has fixing holes to be aligned, in use, with the fixing holes or fixing slots of the locking plate.

* * * * *